March 24, 1936.  A. RENFREW  2,035,190
MANUFACTURE OF THERMOPLASTIC RESINOUS MATERIALS
Filed Feb. 17, 1933
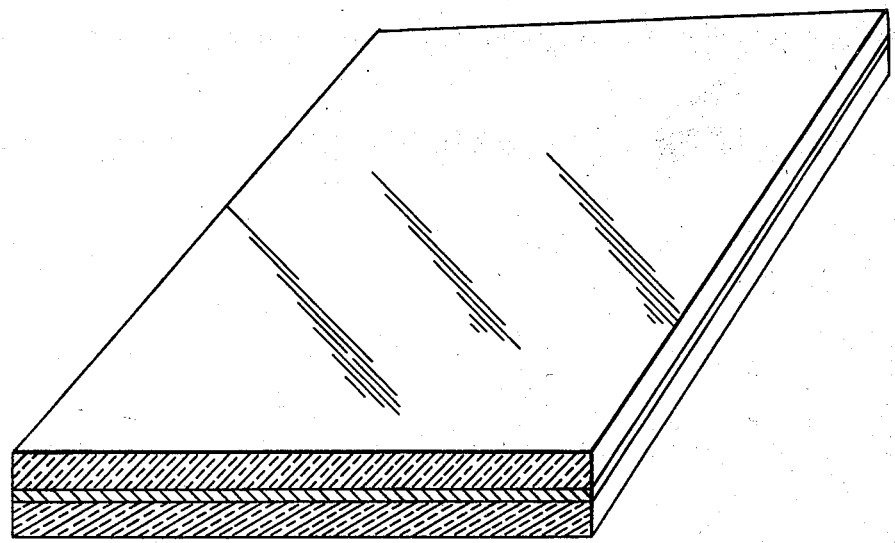
INVENTOR.
Archibald Renfrew
BY
ATTORNEY Patented Mar. 24, 1936

2,035,190

UNITED STATES PATENT OFFICE 2,035,190

MANUFACTURE OF THERMOPLASTIC RESINOUS MATERIALS

Archibald Renfrew, Giffnock, Scotland, assignor to Imperial Chemical Industries Limited, a corporation of Great Britain Application February 17, 1933, Serial No. 657,302
In Great Britain February 29, 1932

4 Claims. (Cl. 260—2)

This invention relates to the manufacture of thermoplastic resinous materials, e. g. polymerized vinyl acetate or the like, and in particular to a method for deaerating or removing bubbles from plates, blocks or other compact masses of such materials.

While it might be thought that the removal of bubbles could be accomplished by heating the material to such a temperature that it becomes liquid, or at least sufficiently fluid for the bubbles to rise of themselves within a reasonable time, it is found in practice this can seldom be done on account of the heat sensitive properties of the thermoplastic resinous material. Some, for instance, cannot be heated to a sufficient temperature without thermo hardening taking place, while others, for example vinyl acetate polymers, decompose with the development of a yellow color and/or a formation of more bubbles.

It is, therefore, an object of the invention to provide a method of deaerating thermoplastic resinous material and the invention includes the resulting product and laminated glass containing such product.

The drawing accompanying this application is generally illustrative of a sheet of glass containing an inner layer of thermoplastic material prepared in accordance with the invention.

According to the invention, we deaerate a bubbly compact mass of thermoplastic resinous material by subjecting it under pressure in a suitable shaped container, for a more or less extended period of time, to a temperature sufficient to soften the mass, but not so high as to cause its decomposition or loss of thermoplasticity, while any free surface of the mass is covered with an inert liquid. Any inert liquid which has no deleterious effect on the material may be used for the purpose of the invention, but in the case where the material contains residual volatile matter, e. g. traces of solvents used in its manufacture, we prefer to use a liquid which is a solvent for such volatile matter. Water, alcohol, oils, for instance, vegetable oils such as castor oil, or mineral oils such as hydrocarbon oil are examples of inert liquids which may be used in particular cases, such as that of polymerized vinyl acetate.

In the preferred method of carrying out the invention we place the mass of thermoplastic material in an open vessel of suitable shape, and cover it with the inert liquid. We then transfer the vessel and contents to an autoclave and subject them to a moderately elevated temperature, e. g. 50–200° C., and high pressure, e. g., 2–50 atmospheres. The temperature, pressure and time of treatment depend on the nature of the material but may be varied within wide limits. In the case of vinyl acetate polymers a temperature of 120° C. should not be exceeded.

The invention is illustrated by the following example, to which however, it is not limited.

Example

A bubbly block of polymerized vinyl acetate, of the kind insoluble in absolute alcohol, is placed in a tin vessel and is covered with a layer of hydrocarbon oil and heated in an autoclave to 60° C. under a pressure of 400 lbs. per square inch. When this temperature is attained, heating is discontinued and the temperature is allowed to fall to 20° C. overnight, and the pressure is then released. The bubbles are found to have left the interior of the block and either to have disappeared or to have risen to the surface of the block. The hydrocarbon oil may be replaced by water, absolute alcohol or castor oil.

While the above example specifically refers to polymerized vinyl acetate, it is understood that other plastic materials may be employed and that their use is contemplated. Among such materials are the vinyl compound resins, methyl methacrylate resin and phenol-formaldehyde cast type resin.

The thermoplastic material treated according to the invention may be substantially free from foreign matter, or it may contain one or more of the usual softening agents (e. g. dibutyl phthalate) or fillers (e. g. barytes) or other common adjuvants.

As many apparently widely different embodiments of this invention may be made without departing from the spirit and scope thereof, it is to be understood that I do not limit myself to the specific embodiments thereof except as defined in the following claims:

I claim:

1. A method of removing bubbles from already formed thermo-plastic material which comprises subjecting the material as a unit, without the addition of solvent thereto, in a bath of an inert liquid, said bath covering any free surface of the material, to a pressure, to a temperature and for a period of time sufficient to soften the mass but insufficient to cause decomposition or loss of thermoplasticity.

2. The method according to claim 1 wherein the material is a vinyl compound resin.

3. The method according to claim 1 wherein the material is polymerized vinyl acetate.

4. The method according to claim 1 wherein the material is a methyl methacrylate resin.

ARCHIBALD RENFREW.